UNITED STATES PATENT OFFICE.

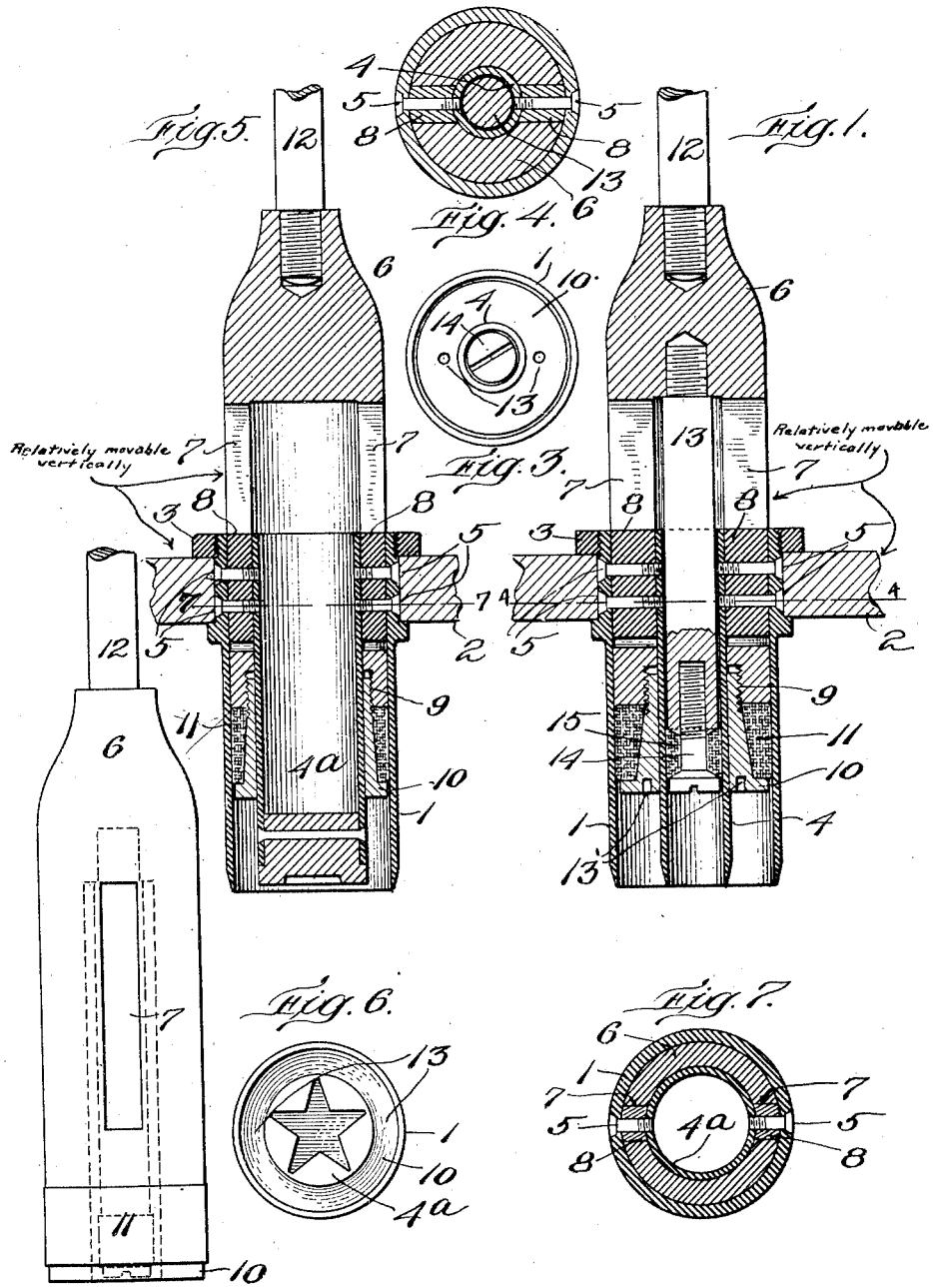

LAWRENCE T. HENNEBERRY, OF BOSTON, MASSACHUSETTS.

CUTTER-HEAD.

1,372,949.   Specification of Letters Patent.   Patented Mar. 29, 1921.

Application filed December 5, 1918. Serial No. 265,349.

*To all whom it may concern:*

Be it known that I, LAWRENCE T. HENNEBERRY, a citizen of the United States, residing at Boston, in the county of Suffolk and State of Massachusetts, have invented certain new and useful Improvements in Cutter-Heads, of which the following is a specification.

My invention relates to cutter heads for use in making articles of confectionery, pastry and the like, and it has for its object to provide an improved cutter head of this kind.

Cutter heads of the class referred to are ordinarily incorporated in automatic and other machines for cutting out articles such, for example, as lozenges, crackers and the like from a ribbon or sheet of confectionery or pastry dough, the latter being placed upon a table or bed arranged below a vertically movable cross-head carrying a plurality of such cutter heads. In machines of this kind the cutter heads usually comprise a tubular cutting die of circular or other desired shape within which is arranged a clearer or ejector relatively movable with respect to the cutter and by means of which the article that is cut out of the ribbon of dough is pushed from the cutter when the latter is raised.

In one type of cutter head heretofore proposed, the clearer or ejector consists of a piston working back and forth within the tubular cutting die without directly engaging the cut out article but acting to discharge the latter from the die by air pressure as the piston is forced toward the lower cutting edge of the die. Cutter heads of this kind have the advantage that the ejector does not directly engage the cut out article, but they have heretofore been so constructed as to only cut out the articles from the ribbon of dough and it was necessary to subsequently operate upon each cut out article if and when it was desired to emboss or otherwise operate upon the middle portion thereof as is generally the case in making lozenges. Moreover, the embossed or otherwise operated upon cut out articles were not of uniform or symmetrical shape and were comparatively expensive to produce. The main object of my invention is to provide an improved pneumatic cutter head which will simultaneously emboss or otherwise operate upon the middle portion of the cut out article when the cutter head is lowered into engagement with the ribbon of dough thus securing uniformity and symmetry of product and lessening the cost of manufacture.

To these ends my invention consists of a cutter head of the class described having the novel features of construction and mode of operation set forth in the following description and particularly pointed out and defined in the claims at the close thereof.

In the accompanying drawings:—

Figure 1 is a central longitudinal sectional view of a cutter head constructed in accordance with my invention.

Fig. 2 is an elevation of the tubular piston of the cutter head shown in Fig. 1.

Fig. 3 is an end view of the cutter head of Fig. 1.

Fig. 4 is a section on line 4—4 of Fig. 1.

Fig. 5 is a central longitudinal sectional view of another form of cutter head embodying the invention.

Fig. 6 is an end view of the head shown in Fig. 5.

Fig. 7 is a section on line 7—7 of Fig. 5.

The cutter head shown in Figs. 1, 2, 3 and 4 comprises an outer tubular die 1 herein shown as circular in cross-section, said die being rigidly secured to a vertically reciprocated cross-head 2 by means of a nut 3 screwed on to the upper exteriorly threaded end of said die. This cross-head 2 is the die-carrying cross-head of the cutting machine in which the cutter head is incorporated, and has imparted to it a vertical reciprocatory movement to carry the cutter head into and out of engagement with the ribbon of dough that is placed upon the table or bed (not shown) of the machine, said bed being located immediately below the cross-head 2.

Within the outer die 1 is arranged an inner tubular cutting die 4 having a cylindrical exterior, the upper end of this inner die 4 being rigidly fastened to the outer tubular cutting die 1 by screws 5. The exterior diameter of inner die 4 is made less than the interior diameter of the outer die 1 so as to provide an annular space between the two that is occupied by the lower tubular end of a piston 6, Fig. 2, the tubular portion of piston 6 being formed with two diametrically positioned longitudinal slots 7 within each of which is slidably arranged a block 8. The screws 5 extend through these blocks 8 and fasten said blocks and the two dies firmly together, at the same time leaving the two dies and the blocks free to slide longitudinally with relation to the piston.

The lower end of the piston 6 is made with an interiorly threaded countersink 9 into which is screwed a flanged nut 10 between which and the end of the piston is compressed a ring of felt packing 11 which provides a tight joint between the piston and the outer die 1. The interior of piston 6 and of the nut 10 are made to snugly fit the exterior of die 4 so as to provide a practically air tight joint between said die and said piston.

It will thus be clear that when the two dies are moved longitudinally with relation to the piston, air will be drawn into and be forced out of the lower end of die 1 as in the case of a pump piston.

To the upper end of piston 6 is secured one end of a stem 12 which is intended to be fastened at its upper end to another vertically reciprocated cross-head forming part of the machine, but which, if desired, may be fastened to a stationary fixture.

The movements of this second cross-head are, as usual, timed or occasioned so that the piston 6 occupies a retracted position within the die 1 when the latter is moved down into engagement with the ribbon of dough and does not move toward the cutting edge of said die until the latter has been raised away from the ribbon. During its movement toward said cutting edge, the piston 6 does not directly engage the cut out article which is within the lower end of die 1 but acts through the air within said die to expel the cut out article from said die 1 so that it drops free and clear of the latter.

The inner die 4 is sharpened at its lower end to cut a circular piece or section from the wafer or cut out article thereby forming a hole at the exact center thereof, this hole forming operation occurring, as will be clear, simultaneously with the cutting out operation.

Within the inner die 4 is a second piston 13 having at its lower end a tapped hole to receive a screw 14 whose head clamps a packing ring 15 of felt or the like against the end of stem 13 and expands said packing against the interior of die 4. It will thus be clear that the piston 13 moves relatively to its tubular cutting die when piston 6 moves relatively to its tubular cutting die, and that piston 13 will act through the air in front of it to discharge from the cutting die 4, the disk removed from the article at the same time that piston 6 acts in like manner to discharge the cut out article from the cutting die 1. As a matter of fact, in practice the disk cut out by inner cutter 4 will oppose the air pressure to less degree than the article cut out by outer cutter 1 with the result that the disk will be ejected from its cutter before the article is ejected from cutter 1.

Continued use of the cutter head requires adjustment of the packing 11 and for this reason the nut 10 is made at its outer end with two diametrically disposed sockets 13' to receive the tangs of a spanner wrench by means of which said nut may be quickly and conveniently adjusted toward the end of the body of the piston to expand the packing ring 11 as may be required through wear thereof. Likewise, the screw 14 may be adjusted to expand packing ring 15 when necessary.

The construction of the cutter head shown in Figs. 5 and 6 is the same as that already described except that in said figures an inner embossing die 4ª is substituted for the cutting die 4 of Fig. 1, and the inner piston 13 is not employed. The lower end of die 4ª is shaped to form a star shaped figure upon the top side of the cut out article. the said lower end being offset inwardly with relation to the cutting edge of outer die 1 a distance slightly less than the thickness of the cut out article.

The interior parts of the cutter head are lubricated by any suitable substance, glycerin being that commonly employed. This lubricant also acts to seal the joints between both piston packings and the interiors of their dies 1 and 4, as well as between the piston 6 and the exterior of die 4, thus closing said joints against the passage therethrough of air.

What I claim is:

1. A cutter head of the character described comprising a tubular cutter into the cutting end of which the cut out portion of the material is forced during the cutting operation, and a longitudinally movable piston snugly fitted within said tubular cutter for pneumatically expelling said cut out portion from said tubular cutter without contacting with said cut out portion.

2. A cutter head of the character described comprising a tubular cutter into which the cut out portion of the material is forced during the cutting operation; a piston snugly and movably fitted within said tubular cutter, and means for effecting relative movement between the piston and tubular cutter to cause said piston to pneumatically expel said cut out portion from said tubular cutter without contacting with said cut out portion.

3. A cutter head of the character described comprising a tubular cutter into which the cut out portion of the material is forced during the cutting operation, and a piston snugly and movably fitted within said tubular cutter for pneumatically expelling said cut out portion from said tubular cutter after the cutting operation has been completed and without contacting with said cut out portion.

In testimony whereof I have affixed my signature.

LAWRENCE T. HENNEBERRY.